United States Patent [19]

St. Jacques et al.

[11] Patent Number: 4,519,240
[45] Date of Patent: May 28, 1985

[54] ELECTROSTATIC GAS TURBINE SURGE/STALL DETECTION

[75] Inventors: John W. St. Jacques, West Palm Beach; Robert P. Couch, Palm Beach Gardens, both of Fla.

[73] Assignee: United Technologies Corporation, Hartford, Conn.

[21] Appl. No.: 454,121

[22] Filed: Dec. 28, 1982

[51] Int. Cl.³ .............................. G01M 15/00
[52] U.S. Cl. .................................... 73/116
[58] Field of Search ............... 73/116, 115; 324/459; 60/39.03; 340/60

[56] References Cited

U.S. PATENT DOCUMENTS 3,029,633  4/1962  Bauer ................................. 73/116

4,359,893  11/1985  Kizler ............................ 73/116 X

Primary Examiner—Gerald Goldberg
Assistant Examiner—Ellwood G. Harding, Jr.
Attorney, Agent, or Firm—M. P. Williams; Gerald E. Linden

[57] ABSTRACT

A pair of biased electrostatic probes (27, 28) disposed adjacent respective inlets (32) of the combustor (20) in a gas turbine engine (10) provide an indication of surge (82) if signals, resulting from the outflow of ionic combustion products from the burner can, appear thereon simultaneously, or indications of stall stagnation (97) if signals appear on the two probes out-of-phase with one another, or if either probe senses repetitive signals thereon.

7 Claims, 6 Drawing Figures

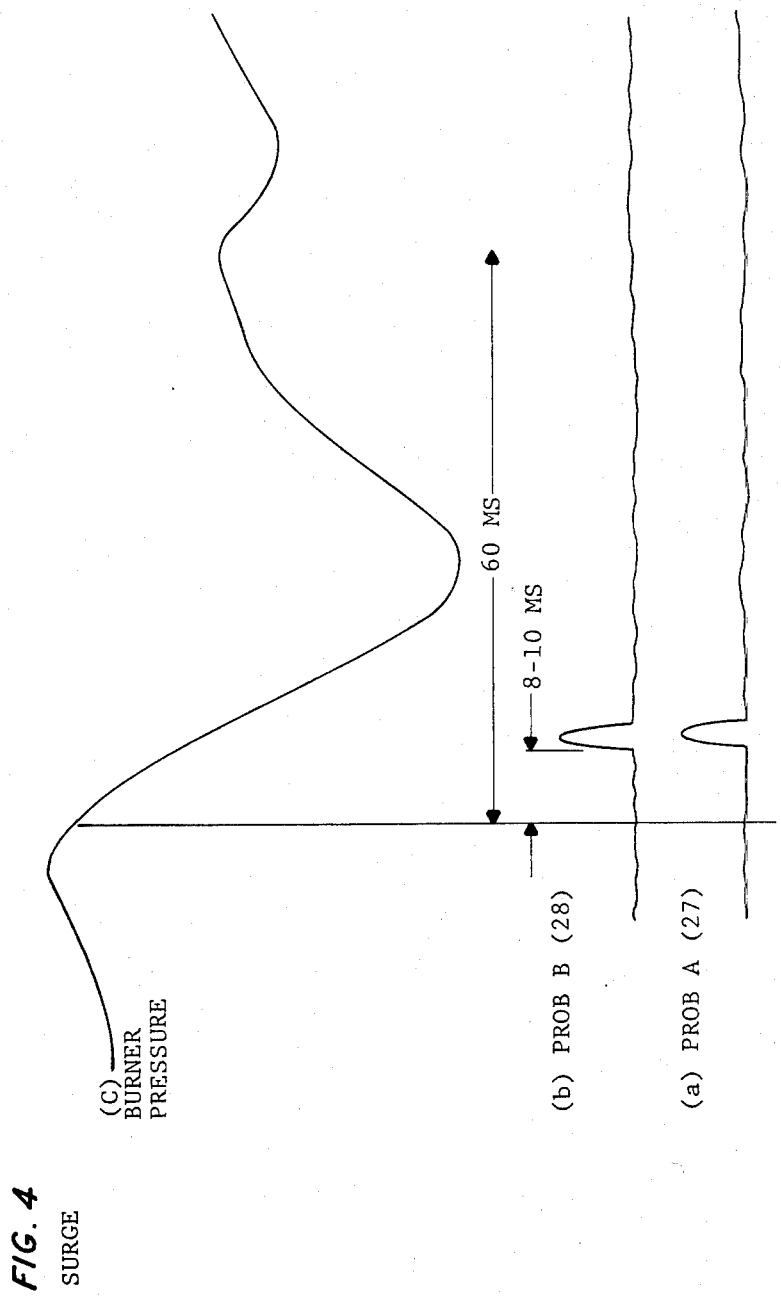

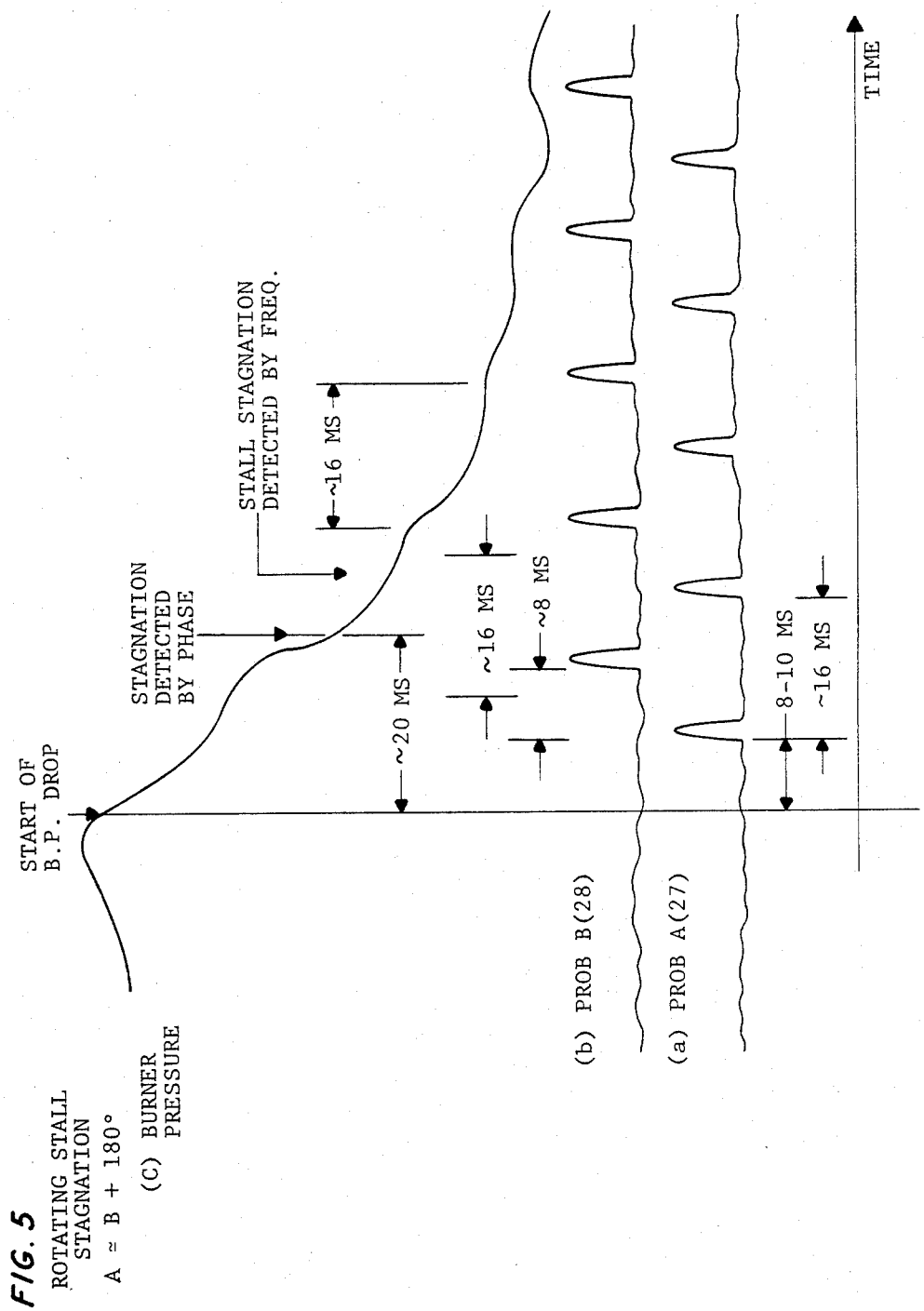

ELECTROSTATIC GAS TURBINE SURGE/STALL DETECTION

The Government has rights in this invention pursuant to Contract No. F33657-81-C-0001 awarded by the Department of the Air Force.

DESCRIPTION

1. Technical Field

This invention relates to surge detection in gas turbine engines, and more particularly to early detection of and discrimination between surge and rotating stall stagnation, by electrostatic detection means.

2. Background Art

As is known in the gas turbine art, compressor surge can occur as a consequence of stall conditions on a sufficient number of compressor blades. Blade stall is known to result from various conditions, including: severe acceleration (variously referred to as "jam" or "bodie"); during sideslip or skid (when in evasive action) or as a consequence of turbulent air, which upset conditions at the engine air inlet; or from a violent afterburner light-off. These perturbations cause a sufficient change in the velocity of gas flow through the engine in contrast with the rotational velocity of the compressor blades, for a given compressor blade angle, so that the resultant angle of attack causes airfoil stall. When a sufficient number of blades are stalled, a surge (a detectable, violent engine event) may occur. A mild surge may simply result in a momentary pressure drop and flow reversal of the gas stream which is self-recoverable. A more severe surge may result in multiple surge cycles which may be self-recoverable or may require control action to assist recovery. Under certain conditions, surges can result in rotating stall and airflow stagnation, in which the stall condition has so upset the compression process that sufficient energy for recovery is not available without some external action being taken.

In the art, a variety of means are known for detecting surge/stall. For instance, devices which sense radial or upstream/downstream pressure ratios are disclosed in U.S. Pat. Nos. 3,858,625 and 4,103,544. Other devices sense stall as a function of compressor discharge pressure (or combustor inlet pressure) as in U.S. Pat. No. Re. 29,667. Still others utilize combinations of the fuel control schedule with temperature and/or pressure events in the engine, such as in U.S. Pat. Nos. 4,060,979, 4,060,980 and 4,117,688. A currently more common manner of detecting surge/stall is the ratio of temperature to rotor speed, as disclosed in U.S. Pat. Nos. 4,108,926 and 4,137,710. The early detection of stall is desirous in order to take corrective action to avoid multiple cycle surges or more severe surge effects, referred to as rotating stall stagnation. For instance, in U.S. Pat. No. Re. 29,667, stall sensed by compressor discharge pressure is utilized to open compressor bleeds, thereby unchoking the compressor and aiding it in recovery from the stall condition. Other corrective actions such as reducing fuel flow, water injection and adjusting some of the compressor vanes in an axial flow gas turbine are also known.

In some engines, stall conditions vary significantly, and can cause different results. For instance, blade stall may result in a surge or a rotating stall stagnation condition. A rotating stall stagnation is characterized by normal gas flow and combustion at some sectors of the engine and abnormal gas flow and combustion at another sector of the engine, the circumferential position of the abnormal sector rotating at less than half the engine rotational speed. The net result is abnormally low airflow which is insufficient to sustain compressor speed.

The surge/stall detection methods of the prior art referred to hereinbefore are inadequate in determining the presence of rotating stall stagnation, and do not provide early discrimination between surge and rotating stall stagnation. Corrective actions to recover from surge are in most cases different from rotating stall stagnation corrective actions. Therefore, in addition to detection of surge and/or stall, discriminating stall stagnation from surge is required before any corrective action is taken.

DISCLOSURE OF INVENTION

Objects of the invention include provision of rapid detection of surge/stall conditions, and discrimination of rotating stall stagnation from surge in a gas turbine engine.

According to the present invention, a voltage-biased electrostatic probe is disposed adjacent to an air inlet port, such as a dilution air inlet of a gas turbine engine combustor. Reverse flow through the dilution air inlet causes highly ionic flame and combustion products in the region of the electrostatic probe, resulting in conductivity from the probe to the combustor and other engine walls, thereby providing an electric signal indicative of reverse gas flow in the engine (surge/stall). In further accord with the present invention, a pair of electrostatic probes are disposed at different circumferential positions about the engine combustor, thereby providing a commensurate, timed response to reverse flow through circumferentially separated dilution air inlets of the combustor, whereby signals indicative of high ion concentrations in the presence of the probes bear a timed relationship which indicates whether the surge/stall condition is a surge or a rotating stall stagnation. According still further to the invention, rotating stall stagnation is detected by the sequence of reverse flow-indicating signals on a single probe or either one of a pair of circumferentially displaced probes. A series of signals within a given time frame characteristic of rotating stall stagnation frequency on one probe or periodic, alternating signals on circumferentially displaced probes is indicative of rotating stall stagnation.

The present invention may be implemented with relatively simple apparatus to provide very rapid detection of surge/stall conditions as well as to distinguish between surge and stall stagnation. The invention may be utilized with other apparatus to take corrective action, in dependence upon the nature of the surge/stall conditions indicated, thereby to provide corrective action of a type known to correct surge or rotating stall stagnation when necessary.

Other objects, features and advantages of the present invention will become more apparent in the light of the following detailed description of exemplary embodiments thereof, as illustrated in the accompanying drawings.

BRIEF DESCRIPTION OF DRAWINGS

FIG. 4 is a simplified timing diagram illustrating the relationship between probe signals of the invention and burner pressure during surge;

FIG. 5 is a simplified timing diagram illustrating the relationship between probe signals of the present invention and burner pressure during rotating stall stagnation.

BEST MODE FOR CARRYING OUT THE INVENTION

Figure 1:
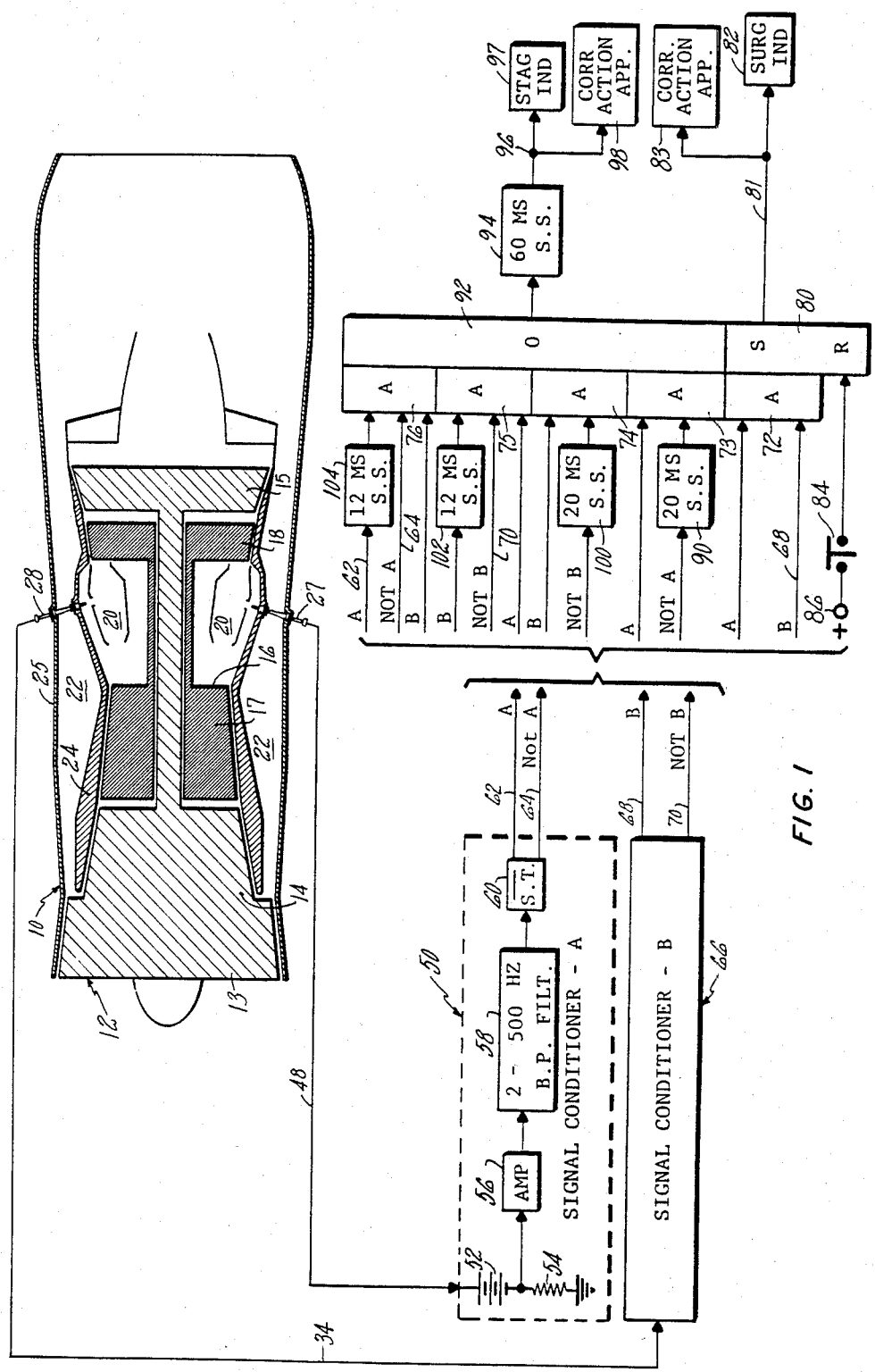
FIG. 1 is a simplified, schematic block diagram of an exemplary embodiment of the invention employing two probes displaced 180° from each other about an engine.

Referring now to FIG. 1, a gas turbine jet engine 10 includes a low pressure spool 12 having a fan 13, a low pressure compressor 14, and a low pressure turbine 15 as well as a high pressure spool 16, including a high pressure compressor 17 and a high pressure turbine 18. An annular burner can or combustor 20 is disposed between the compressors and the turbines. An annular fan duct 22 is defined by inner and outer annular walls thereof 24, 25, respectively. A pair of probes 27, 28 are disposed through the fan duct 22 with their tips in the vicinity of the burner can 20, as described more fully with respect to FIG. 2.

Figure 2:
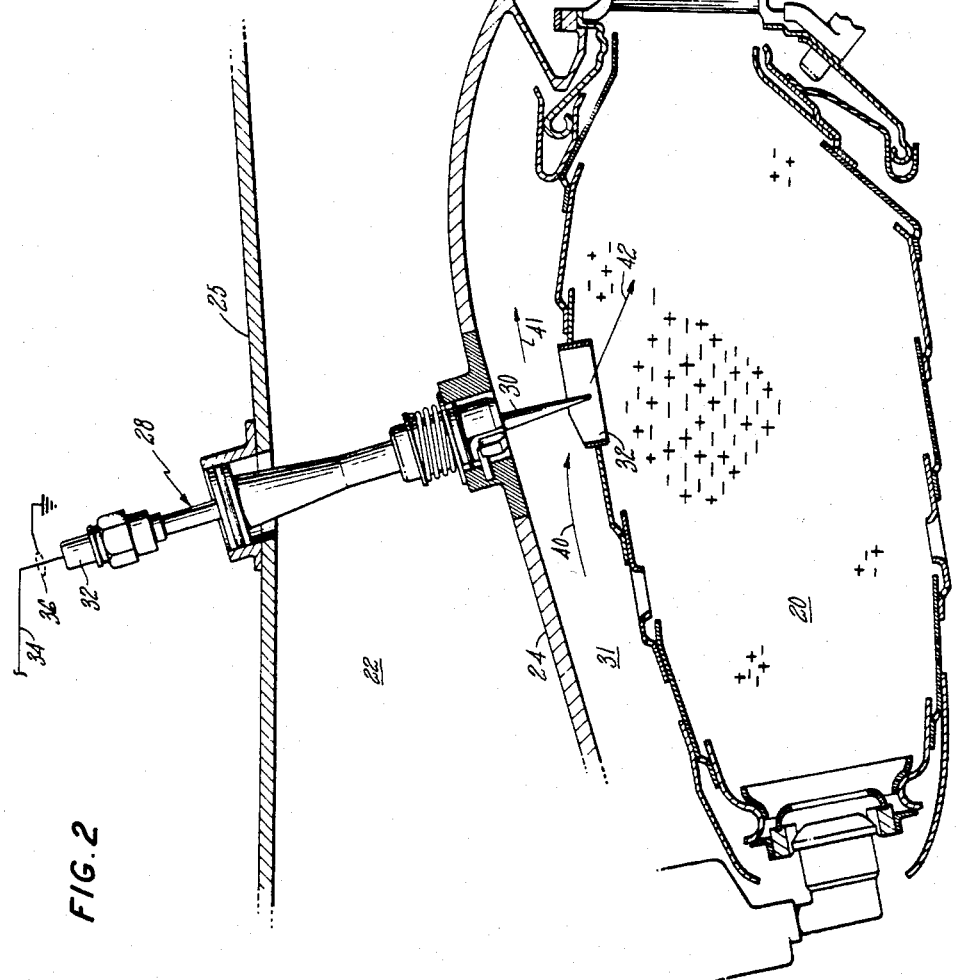
FIG. 2 is a partial, sectioned side elevation view of a burner can with a probe, as in FIG. 1, disposed in proximity with the dilution air inlet thereof, illustrating containment of flame and combustion products within the burner can during normal operation of the engine.

In FIG. 2, the probe 28 is seen to have a tip 30 disposed adjacent the burner can 20, and more particularly in a compressor duct passage 31 just outside of a dilution air inlet 32 thereof. The tip 30 is insulated from the remainder of the probe 28 and terminates in a connector 32 which joins the electrode to a suitable lead 34, which may preferably comprise the inner conductor of a coaxial cable that includes an external grounded shield 36.

Figure 3:
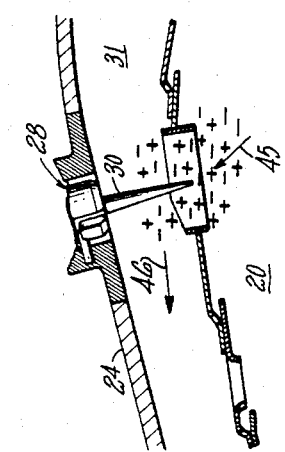
FIG. 3 is a simplified, schematic illustration of the burner can and probe of FIG. 2, illustrating the outflow of combustion products, including ions, in the vicinity of the probe during surge or stall.

The principal of the invention is illustrated by comparison of FIG. 2 with FIG. 3. In FIG. 2, normal engine operation is illustrated by the flow of dilution air being downstream in the passage 31 between the inner fan wall 24 and the burner can 20, as illustrated by a pair of arrows 40, 41. A significant portion of air passes into the burner can 20 through the dilution air inlet 32, as indicated by the arrow 42. During normal operation, with the flow into the burner can, all of the combustion products remain within the burner can 20 (rather than flowing outwardly through the dilution air inlet 32). The combustion products are highly ionized, as illustrated by the plus and minus signs within the burner can 20 in FIG. 2. On the other hand, whenever blade stall results in surge or stall stagnation, the attendant reverse pressure condition causes combustion products to flow outwardly through the dilution air inlet 32 as illustrated by an arrow 45 in FIG. 3, and may in fact flow upstream in the passage 31 between the fan duct inner wall 24 and the burner can 20, as illustrated by an arrow 46. When the combustion products flow outwardly into the vicinity of the probe tip 30, as indicated by the plus and minus signs in FIG. 3, the highly ionic gas permits electrical conduction from the probe 30 to the burner can walls and to the inner wall 24 of the fan duct 22.

Referring to FIG. 1, in an exemplary embodiment, illustrating the principles of the present invention, the probe 27 is connected by a conductor 48 (similar to the conductor 34 for the probe 28) to a signal conditioner 50 for probe 27 which will herein be referred to as signal A. Within the signal conditioner, the conductor 48 is connected to the positive side of a D.C. source 52, which may be a battery or other suitable power supply, and may have a potential of 10 to 70 volts. The other side of the source 52 is connected through a resistor 54 to ground. When ions are present in the passageway 31 (FIG. 3), current flows from ground through the resistor 54 and battery 52, through the probe 27, through the ionic plasma in the passageway 31 and to the walls of the engine. This provides a voltage on the resistor 54 which may be amplified by an amplifier 56, which may have a gain of about ten, the output of which is applied to a band-pass filter 58 which may have a pass band on the order of 2 to 500 Hz. The filtered signal is applied to a Schmidt trigger 60 having a suitable negative threshold, so that when the input thereto exceeds the negative threshold, a discrete signal, "A", will appear on a line 62. For simplicity herein, it is assumed that the Schmidt trigger 60 is of the type that otherwise provides a discrete signal, "NOT A", on a line 64. Assuming that the battery 52 has a potential of 67 volts, the resistor 54 is 100 kilohms and the amplifier 56 has a gain of about 10, the Schmidt trigger may have a negative threshold of about −1 volt. The lead 34 for the probe 28 is connected to a signal conditioner 66 (which is the same as the signal conditioner 50) that provides signal B and NOT B signals on lines 68, 70, respectively.

Referring now to FIG. 4, illustrations (a) and (b) show the signals which will be present on the lines 62 and 68, respectively, when a single (self-recoverable) surge occurs, as shown by burner pressure in illustration (c) of FIG. 4. These are shown as positive signals, for simplicity of illustration. As an example, at the onset of a surge, burner pressure begins to drop and may drop from on the order of 50–300 psia to on the order of 20 psia in about 30 milliseconds (depending upon the altitude condition, severity of the surge and the rotary speed of the engine at the time of surge). After only a few psia drop in burner pressure, reverse flow occurs (FIG. 3) causing the conductivity illustrated therein to result in simultaneous signals through both probe A and probe B on lines 62 and 68, respectively, within 8 or 10 milliseconds of the onset of burner pressure drop. During rotating stall stagnation, at any given point in time, a stall stagnation "cell" exists in one sector of the engine, whereas proper combustion, pressure relationships and normal flow conditions exist in other, circumferentially displaced sectors of the engine. The portion of the engine exhibiting a stall stagnation cell experiences rotation about the compressor burner at less than half the engine rotary speed. In a typical case, this amounts to about 16 milliseconds per revolution of the stall stagnation cell. In FIG. 5, since probe A and probe B are displaced from each other, and since the effects of stall stagnation are rotating, the ionic outflow from the burner can (FIG. 3) will reach probe A and then probe B on a 180° phase displacement. This amounts to about 8 milliseconds difference between the time each of the probes will be in the vicinity of the rotating stall stagnation. As illustrated in FIG. 5, assuming the rotating stall stagnation occurred just prior to reaching probe 27, the rotating stall stagnation can be initially detected by comparing the phase of signals on the two probes, in approximately 20 milliseconds from the onset of burner pressure drop. On the other hand, assuming that only one probe were attached to the engine, the cyclic nature of the signals on either of the probes indicates that stall stagnation can be detected by successive pulses on the same probe separated by approximately the period of stall stagnation rotation (here indicated as being about 16 milliseconds) which is characteristically higher frequency than multiple cycle surges. Thus, stall stagnation cannot only be detected, but discriminated from surge, by either one probe or two probes in dependence upon whether frequency and/or phase is utilized to confirm the stall stagnation. Frequency, phase and a minimum detected number of consecutive cycles used concurrently to verify surge or rotating stall stagnation provide a high degree of confidence that a detected event is real in order that a false discrimination of the type of stall does not occur.

Referring to FIG. 1, the A, NOT A, B, and NOT B signals may be utilized, with certain delays, as inputs to a plurality of AND circuits 72-76 to detect and/or distinguish the conditions described with respect to FIGS. 4 and 5, and to provide respective time signals indicative of the relative times of the signals on the probes. Specifically, an AND circuit 72 detects the simultaneous presence of signals on both probe A and probe B so as to set a bistable device 80 which provides a surge signal on a line 81 to a surge indicator 82, or such other utilization device as may be desired, such as a corrective action apparatus 83. As shown in FIG. 1, the bistable device 80 may remain set until reset by an engine control or operator controlled reset switch 84 which is connected from a suitable source 86 to the reset side of the bistable device 80. On the other hand, the output of the AND circuit 72 may be used in any desired way, as an indication of surge.

The AND circuits 73-76 sense rotating stall stagnation, regardless of the direction of rotation thereof (clockwise or counterclockwise) within the engine 10, and sense it both by phase relationship between signal A and signal B as well as frequency content of either signal A or signal B, alone. The AND circuit 73 is responsive to a 20 millisecond single shot 90 which provides a signal for 20 milliseconds following the onset of the NOT A signal, which is contemporaneous with the turn-off of the A signal. The AND circuit is also responsive to the A signal. This means that the AND circuit 73 will operate an OR circuit 92 whenever the A signal appears within 20 milliseconds of having previously disappeared. When the OR circuit 92 operates, it will trigger a 60 millisecond single shot 94, the output of which on the line 96 may be provided to a stagnation indicator 97. It may also be provided to suitable corrective action apparatus 98. In a similar fashion, the AND circuit 74 is responsive to a 20 millisecond single shot 100 connected to the NOT B signal and is also connected directly to the B signal, so that the AND circuit 74 will operate the OR circuit 92 anytime the B signal appears within 20 milliseconds after it has last disappeared. Thus the AND circuits 73, 74 sense the frequency of either the A probe signal or the B probe signal, alone, to detect rotating stall stagnation.

The AND circuits 75 and 76 compare the phase of the A and B signals. The AND circuit 75 is responsive to the A signal concurrently with the NOT B signal, concurrently with the output of a 12 millisecond single shot 102 which provides an output for 12 milliseconds after the appearance of the B signal. Therefore, if the A signal comes up when the B signal is not present, but within 12 milliseconds of the B signal having been present, this senses the 180° phase relationship of FIG. 5 and the AND circuit 75 will cause the OR circuit 92 to operate, thus providing a signal indicative of rotating stall stagnation. Similarly, the AND circuit 76 is responsive to the presence of the B signal when the A signal is absent, but has previously been present within 12 milliseconds, as indicated by the output of a 12 millisecond single shot 104. The utilization of the surge and rotating stall stagnation signals provided by the circuitry of FIG. 1 is not germane to the present invention; any desired utilization of these signals may be made, depending on the manner in which the present invention is used.

The exemplary embodiment of the invention shown in FIG. 1 employs analog and logic circuits to discriminate between surge and rotating stall stagnation. The invention may be implemented by means of suitable program routines in a computer or other signal processing apparatus, which program routines are readily implemented with techniques known in the art to sample the discrete A, NOT A, B and NOT B signals and determine the phase relationship and/or frequency content thereof.

Figure 6:
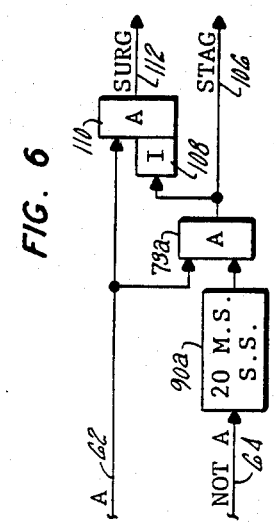
FIG. 6 is a simplified schematic block diagram of a second embodiment of the invention.

The present invention has two aspects, one of which is sensing the phase of two probes suitably disposed about the periphery of an engine, to provide rather rapid discrimination between surge and rotating stall stagnation, as well as early detection of either of them. But as is seen in FIG. 5, the utilization of only a single probe can provide essentially the same information, with slightly greater delay. A simple manner of implementing this is shown in FIG. 6. There the AND circuit 73a and 20 millisecond single shot 90a are the same as the corresponding circuit 73, 90 of FIG. 1. Thus the output of the AND circuit 73a comprises a stall stagnation signal on the line 106. This signal may be provided to an inverter 108 which will enable an AND circuit 110 to respond to the A signal on the line 62 only if the A signal had not gone off within the prior 20 millisecond period. Thus it may sense the first A signal as a surge, by the AND circuit 110 providing a surge signal on a line 112, but when an immediately following A signal appears, the AND circuit 73a will provide the stagnation signal on the line 106 and the inverter 108 will cause the AND circuit 110 to shut down, thereby no longer providing the surge signal on the line 112. In general, the detection of two pulses within about 25 milliseconds will suffice to sense stall stagnation within a single probe. The timing between pulses may vary with engine type. Therefore, rotating stall and surge frequencies should be known before selecting pulse separation intervals used to discriminate between surge and rotating stall stagnation.

The utilization may include reducing fuel (de-rich), opening compressor bleed valves, cambering variable stator geometry water injection, or other corrective action known to the art. The probes 27, 28 may take the form of any suitable electrostatic probe known to the art, or they may be of the form described in a commonly owned, copending U.S. patent application entitled "Gas Turbine Access Port Plug Electrostatic Probe", Ser. No. 454,113, filed contemporaneously herewith by Shattuck et al.

The embodiment shown herein utilizes probes displaced 180° apart, about the periphery of the combustor or burner can 20. However, the invention may be practiced with probes spaced more closely, such as at 90°, or any other spatial relation. In part, the spacing of the probes will be dependent upon the positions of dilution air inlet holes in the burner can or the availability of access thereto for the purpose of providing probes through the inner and outer walls of the fan duct, or other engine walls. The timing between the two probes will vary in a commensurate manner. The present embodiment describes the relative probe timing for stall stagnation to be on the order of 8 milliseconds for two probes separated by 180°; in the limit, at highest possible engine speeds, it is safe to take relative signal separations of about 3 or 4 milliseconds or more for probes separated by 180° as an indication of stall stagnation. This means that in the general case, for probes located more closely than 180°, it is safe to identify stall stagnation by signals timed relatively by about 20 microseconds per degree of probe separation, or more. Similarly, surge can be identified if the signals are relatively contiguous in time, and for that purpose, they may be determined to be contiguous if they are within 10 microseconds of each other per degree of accurate separation of the probe (less than about 2 milliseconds when separated by 180°). When employing digital apparatus that samples the two probes one after the other, rather than simultaneously, the sampling rate will probably result in a minimum arcuate separation for the two probes. Similarly, the lack of accuracy in analog circuits may dictate that the probes be separated by some minimum number of degrees.

Although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. Electrostatic responsive apparatus for detecting electrostatic charge in a gas turbine engine having a compressor, a burner section including a burner can with air inlet ports through the walls thereof for allowing compressor outflow to enter said burner section, a compressor duct for conducting compressor outflow to and around said burner section, and a turbine disposed downstream of said burner section, comprising:
    a pair of electrostatic probes, each of said probes disposed for response to electrostatic charge in gas within said compressor duct adjacent to said burner section, said probes being arcuately separated from one another by a known significant portion of a semicircle in substantially the same lateral engine cross section;
    bias means for providing a bias voltage separately to each of said probes; and
    signal processing means connected for response to said probes, for providing a first probe signal in response to each occurrence of significant conductivity of the gas adjacent a first one of said probes, for providing a second probe signal in response to each occurrence of significant conductivity of the gas adjacent a second one of said probes, and for providing time signals indicative of the relative times at which said first probe signal and said second probe signal are provided.

2. Apparatus according to claim 1 wherein said signal processing means comprises means for providing a rotating stall stagnation signal in response to one of said time signals indicating a lapse between said first and second probe signals of more than a threshold interval of time dependent on the arcuate separation of said probes.

3. Apparatus according to claim 1 wherein said signal processing means comprises means for providing a surge signal in response to one of said time signals indicating a lapse between said first and second probe signals of less than a threshold interval of time dependent on the arcuate separation of said probes.

4. Apparatus according to claim 1 wherein said signal processing means comprises means for providing a rotating stall stagnation signal in response to one of said time signals indicating a lapse between said first and second probe signals of more than a threshold interval of time dependent on the arcuate separation of said probes, or in response to either two of said first probe signals or two of said second probe signals occurring within a predetermined time interval.

5. Electrostatic responsive apparatus for detecting electrostatic charge in a gas turbine engine having a compressor, a burner section including a burner can with a dilution air inlet through the walls thereof for allowing compressor outflow to enter said burner can, a compressor duct for conducting compressor outflow to and around said burner section, and a turbine disposed downstream of said burner section, comprising:
    an electrostatic probe disposed for response to electrostatic charge in gas within said compressor duct adjacent to said burner section;
    bias means for providing a bias voltage to said probe; and
    signal processing means connected for response to said probe, for providing a probe signal in response to each occurrence of significant conductivity of the gas adjacent said probe, and for providing a rotating stall stagnation signal in response to two successive probe signals being provided within a predetermined time interval.

6. A method for detecting and discriminating between surge and rotating stall stagnation in a gas turbine engine having a compressor, a burner section including a burner can with a dilution air inlet through the walls thereof for allowing compressor outflow to enter said burner section, a compressor duct for conducting compressor outflow to and around said burner section, and a turbine disposed downstream of said burner section, comprising:
    disposing a voltage-biased electrostatic probe within said compressor duct adjacent said air inlet so that current will flow through said probe in response to the presence of ions in the vicinity of said probe;
    providing a signal indicative of surge in response to current flowing through said probe a single time within a given period of time; and
    providing a signal indicative of rotating stall stagnation in response to current flowing through said probe a plurality of times within said given period of time.

7. A method according to claim 6 further comprising disposing a second voltage-biased electrostatic probe in said compressor duct adjacent to a second one of said air inlets arcuately separated from said first air inlet by a known significant portion of a semicircle in substantially the same lateral engine cross section so that current will flow in said second probe in response to the presence of ions in the vicinity of said probe;
    providing said signal indicative of surge in response to current flowing substantially simultaneously in both of said probes; and providing said signal indicative of rotating stall stagnation in response to current flowing in both of said probes when the current flowing in one of said probes is delayed, by more than a threshold interval of time dependent on the arcuate separation of said probes, from the time of current flow in the other of said probes.

* * * * *